(12) United States Patent
Matt et al.

(10) Patent No.: US 6,581,153 B1
(45) Date of Patent: Jun. 17, 2003

(54) INTEGRATED CIRCUIT

(75) Inventors: Hans Jürgen Matt, Remseck (DE); Dieter Kopp, Illingen (DE); Michael Trompf, Heimsheim (DE); Stefan Späth, Weil der Stadt (DE)

(73) Assignee: STMicroelectronics S.r.l., Agrate Brianza (MI) (IT)

( * ) Notice: Subject to any disclaimer, the term of this patent is extended or adjusted under 35 U.S.C. 154(b) by 240 days.

(21) Appl. No.: 09/292,959

(22) Filed: Apr. 16, 1999

(30) Foreign Application Priority Data

Apr. 17, 1998 (DE) .......................... 198 17 024

(51) Int. Cl.⁷ .......................... G06F 15/16; G06F 13/40
(52) U.S. Cl. .......................... 712/35; 712/36; 709/238
(58) Field of Search .......................... 455/556, 403, 455/557; 710/15, 19, 34, 35, 38, 129; 712/35, 34, 32, 31, 36, 29, 17, 41, 52, 56; 370/408, 256; 714/748; 709/214, 213, 229, 233, 238

(56) References Cited

U.S. PATENT DOCUMENTS

| | | | |
|---|---|---|---|
| 5,491,828 A | | 2/1996 | Intrater et al. .................. 712/35 |
| 5,511,215 A | | 4/1996 | Terasaka et al. ............... 712/25 |
| 5,541,927 A | * | 7/1996 | Kristol et al. .................. 370/408 |
| 5,911,082 A | * | 6/1999 | Monroe et al. ................. 712/35 |
| 6,128,509 A | * | 10/2000 | Veijola et al. ............... 455/556 |

OTHER PUBLICATIONS

Claus Kuhnel et al, dsp Und Mikrocontroller im Sensorknoten vereint. In: Elektronik 26/1995, S. 94–97.

R. Grehan, DSPs get parallel. In: Computer Design, Sep. 1997, S.83–98, Proceedings of the 5$^{th}$ International Conference on Signal Processing Applications and Technology, vol. 1, 1994, S.85–90.

Andreas Gierlinger et al, Horst 16tm: A DSP Core for ASICS, Proceedings of the 5$^{th}$ International Conference on Signal Processing Applications and Technology, vol. 1, 1994, pp. 85–90.

* cited by examiner

Primary Examiner—Daniel H. Pan
(74) Attorney, Agent, or Firm—Sughrue Mion, PLLC

(57) ABSTRACT

An integrated circuit contains a processor (DSP) for the processing of data, at least two modules (M1, M2, M3) for the processing of data packets selected by the processor according to differing operation regulations, and a router (ROUTER) which is connected to all modules (M1, M2, M3) and to the processor (DSP) for the purpose of controlling the data traffic between the processor (DSP) and the modules (M1, M2, M3). The router is suited to receive from the processor (DSP) data packets and associated instructions, to execute special operations for individual data packets which can be executed by the modules (M1, M2, M3) in specified sequence, to coordinate autonomously the control of the sequences, to transfer the data packets to the appropriate modules (M1, M2, M3), and to transfer the data packets after they have been processed according to the specified instructions to the processor (DSP).

7 Claims, 1 Drawing Sheet

INTEGRATED CIRCUIT

This application is based on and claims the benefit of German Patent Application No. 198 17 024.6, which is incorporated by reference herein.

BACKGROUND OF THE INVENTION

The invention concerns an integrated circuit according to the characterizing portion of claim 1. An integrated circuit of this type serves in particular to process data, for example, filtering, transformation, and/or modulation of data.

An arrangement known from Proceedings of the 5th International Conference on Signal Processing Applications and Technology, Volume 1, 1994 pages 85–90, provides for the use of a digital signal processor for various language coding applications as the core of an ASIC. The digital signal processor is used among other things for routine applications which could also be performed by separate modules that function exclusively according to special operating regulations that differ from each other, the modules being able to execute the special routine tasks more efficiently than the digital signal processor. As a result of the routine applications, approximately 25% of the computing capacity is occupied in the digital signal processor. But even if the routine tasks were all performed in separate modules, the task of controlling the data transfer from and to the modules must still be handled by the signal processor which would further impair its computing capacity. For example, the digital signal processor often serves only as a relay station if, for example, several modules must be run sequentially but the data packets must be sent with central coordination from digital signal processor to module 1, received by module 1, sent to module 2, received by module 2, sent to module 3, etc. The computing capacity of the digital signal processor is needed in ASICs primarily for special, customer oriented applications.

SUMMARY OF THE INVENTION

It is, therefore, an object of the invention to optimize the exploitation of the computing capacity of a processor of an integrated circuit.

This object is achieved a through an integrated circuit according to claim 1. This integrated circuit is characterized in particular in that it contains a router which controls the data traffic between the processor and the modules. Through the use of the router, the triggering of the modules is removed from the processor. Computing time is therefore saved for the processor which can be used for more primary tasks. The router is connected between the processor and the modules and in this manner can direct data packets to several modules sequentially without blocking computing time of the processor. The router accepts orders of the processor and delivers results of the executed orders to processor. By way of example, an order can be: The following data packet should be sequentially transformed, modulated, and filtered. The router is connected to three modules. Each module fulfills a special task. Thus data packets can be filtered in module 1, for example, modulated in module 2, and transformed in module 3. The router receives the data packet which is to be processed from the processor and directs it independently to the modules 3, 2, 1 sequentially. At this point, the data packet has been processed according to the order and is directed to the processor. In this manner, the processor is saved the time for the execution of the order and can use the saved time for other tasks which are not so trivial.

In a preferred exemplary embodiment, processor and router are constructed such that data packets and associated instructions for special operations that can be performed by the modules to be performed for individual data packets in the specified sequence are transferred by the processor to the router. The router assumes the control of the sequence autonomously. It coordinates the transport of data packets from and to the proper modules. If the data packets are to be processed following the specified instructions, it transfers them to the processor. The processor thus assumes the role of the order giver which issues an instruction for each data packet and transfers them to the router. The router is the order receiver which transfers the data packets processed in accordance to the instruction to the appropriate modules. The number of modules is limited, with result that the number of instructions is also limited. It is therefore possible to realize the router in a simple manner, for example as an allocation table. Four modules can be addressed with 2 bits, for example module 1 by 01, module 2 by 10, and module 3 by 11. An instruction in bits, for example, would be 011011. The first 2 bits mean that the data packet should first be directed to module 1. The third and fourth bits mean that the data packet should be directed to module 2 after module 1. The fifth and sixth bits mean that the data packet should be directed to module 3 after module 2. Thus, in instruction 110110, modules 3, 1, 2 should be passed through sequentially.

In another preferred exemplary embodiment, the integrated circuit contains a memory for temporary storage of data packets to be processed. The router is connected to the memory. The router receives from the processor, for example, several data packets simultaneously with associated instructions. It is quite possible that different data packets will pass through different modules and in the process a temporary overlapping of the access to the same module might occur. In order to exclude the possibility that a module which is already processing a data packet will receive from the router an additional data packet to process, which would result in a conflict, memory is provided. The router knows which data packet it sent to which module and from which module it has already received the appropriately processed data packet. It coordinates the transfer of data packets independently and is responsible for ensuring that no conflicts occur. If the module is already processing the data packet, the router temporarily stores in the memory an additional data packet to be processed in this module. The additional data packet will only be transferred to the module when it is available. The computing capacity of modules also is optimally used in this manner.

In a further preferred embodiment, the router contains a control unit which has an interface to the processor. Through this interface, data packets and instructions are transferred from the processor to the control unit and processed data packets are transferred from the control unit to the processor. The control unit separates the received data packets from the received instructions. The instructions are evaluated in the control unit, for example, by means of the above described allocation table and then under the control of the control unit, the separated data packets are transferred in the appropriate sequence to the appropriate modules, if appropriate with time delay as a result of a temporary storage in the memory. The instructions are transferred, for example, in a so-called header to the individual data packets. By way of example, each header contains synchronizing bits. This simplifies communication between processor and control unit.

In a further preferred embodiment, the router contains several switches. All switches are triggered by the control unit. The switches are arranged and connected in such a manner that data packets from each module can be forwarded to each other module by means of the switches. The control unit separates the received data packets from the received instructions, evaluates the instructions, and transfers the separated data packets in accordance with the associated instructions to the appropriate modules through appropriately triggering the switches. Through the use of the switches, a flexible and easily modified connection means is provided with the modules and among the modules by which means the instructions can be implemented in a simple manner. The switches are standard components, such as 2×2 switches, which require little chip space. The number of switches is matched to the number of modules. In the case of four modules and one memory, for example, only eight 2×2 switches are required.

In a further preferred embodiment, the control unit transfers the processed data packets together with additional information containing an identifier of the processed data packet through the interface to the processor. A header can also be used for the transfer. In this manner, the same format, header plus associated data packet, can be used in both directions, from the processor to the control unit and from the control unit to the processor. The header contains synchronization bits for both directions: for the direction to the control unit, additional instructions and for the direction to the processor, identifiers. This simplifies communication between processor and control unit.

BRIEF DESCRIPTION OF THE DRAWING

An exemplary embodiment of the invention is explained below with the aid of two figures.

DETAILED DESCRIPTION OF THE INVENTION

Figure 1:
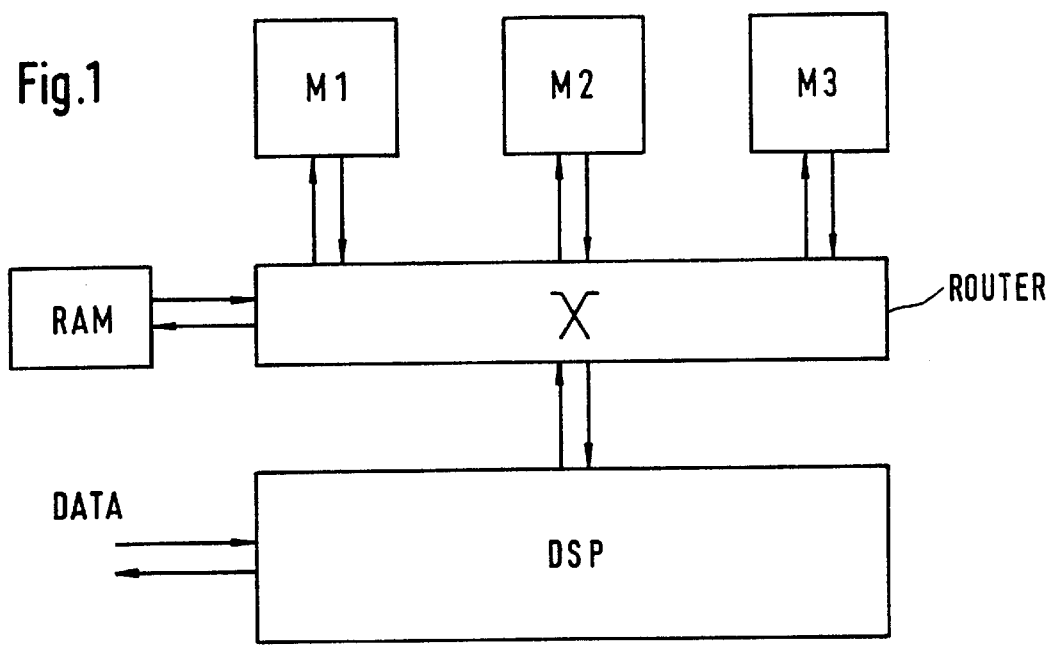
FIG. 1 shows a schematic representation of a section of an integrated circuit according to the invention.

The exemplary embodiment will be explained first with the assistance of FIG. 1. FIG. 1 shows a schematic representation of a section of an integrated circuit according to the invention. The integrated circuit is to be used, for example, as ASIC. The processor DSP is arranged in the core of the integrated circuit. Processor DSP is configured as a digital signal processor. Various units are arranged around processor DSP, for example input/output units as interfaces for receiving and transferring data, analog/digital converters for the conversion of analog signals into digital signals that can be processed by the processor DSP, and a memory which the processor DSP accesses, for example, in order to temporarily store data or download software. Processor DSP contains data from outside of the integrated circuit and has the task of processing this data appropriately. For this, complex steps are necessary. The processor must subject the data to various types of processes. Simpler processes, for example the filtering according to a specified lowpass function or moved out of the processor DSP in order in this manner not to take up the computing capacity of the processor. Arranged around the processor are three modules M1, M2, M3, which perform special operations. These operations, for example, are filtering, modulation, and transformation. The operation regulations are firmly specified. Each module operates according to one operating regulation. Thus, for example, module M1 is provided for the filtering of data, module M2 for the transformation of data, and module M3 for the modulation of data. Module M1 can, for example, be realized as an FIR filter; module M2, for example, by a device for Fourier transformation; and module 3, for example, by a QAM or an MPEG coder. The number of available modules is geared to the tasks which the processor is to execute. Thus, for example, even 20 modules with different and/or in part the same operation regulations can be arranged around processor DSP. The router ROUTER is switched between modules M1, M2, M3 and processor DSP. Router ROUTER is switched to all of modules M1, M2, M3 and processor DSP. Router ROUTER has the function of controlling data traffic between processor DSP and module M1, M2, M3.

Processor DSP transfers out simple processes which are to be carried out in modules M1, M2, M3. Processor DSP transfers to the router ROUTER data packets and associated instructions for special operations which can be performed by modules M1, M2, M3 to be performed in the specified sequence. The router ROUTER then has the task of autonomously coordinating the sequence, transferring the data packets to the appropriate modules M1, M2, M3, and transmitting the processed data packets to processor DSP according to the specified instructions.

Router ROUTER in addition is connected to a memory RAM, for example a so-called read access memory, for temporary storage of data packets to be processed. Data packets to be processed for which a special operation is to be performed in a module M1, M2, M3 which is already processing data packets are temporarily stored by the router ROUTER in memory RAM. For example, two data packets 1 and 2 are transferred by processor to router ROUTER, both of which are to run sequentially through modules M1, M2, M3. Data packet 1 is transferred by router ROUTER to module M1, while data packet 2 is temporarily stored in memory RAM for the duration of the processing of data packet 1 in module M1. When processed data packet 1 is transferred by module M1 to router ROUTER, it is forwarded immediately for other processing to module M2. Data packet M2 is then selected from memory RAM and is transmitted to module M1. Now data packets 1 and 2 are processed at the same time, data packet 1 in module M1 and data packet 2 in module M2. If the processing of data packet 2 in module M1 is completed more quickly than the processing of data packet 1 in module 2, data packet 2 is again temporarily stored in memory RAM, until module M2 is free again. If on the other hand the processing of data packet 1 in module M2 is completed more quickly than the processing of data packet 2 in module M1, data packet 1 is forwarded directly to module M3 and data packet 2 is forwarded directly to module M2. Data packet 1 having been processed by module M3 is transmitted to processor DSP. Data packet 2 is then also directed to module M3 and after processing is transmitted to processor DSP.

Figure 2:
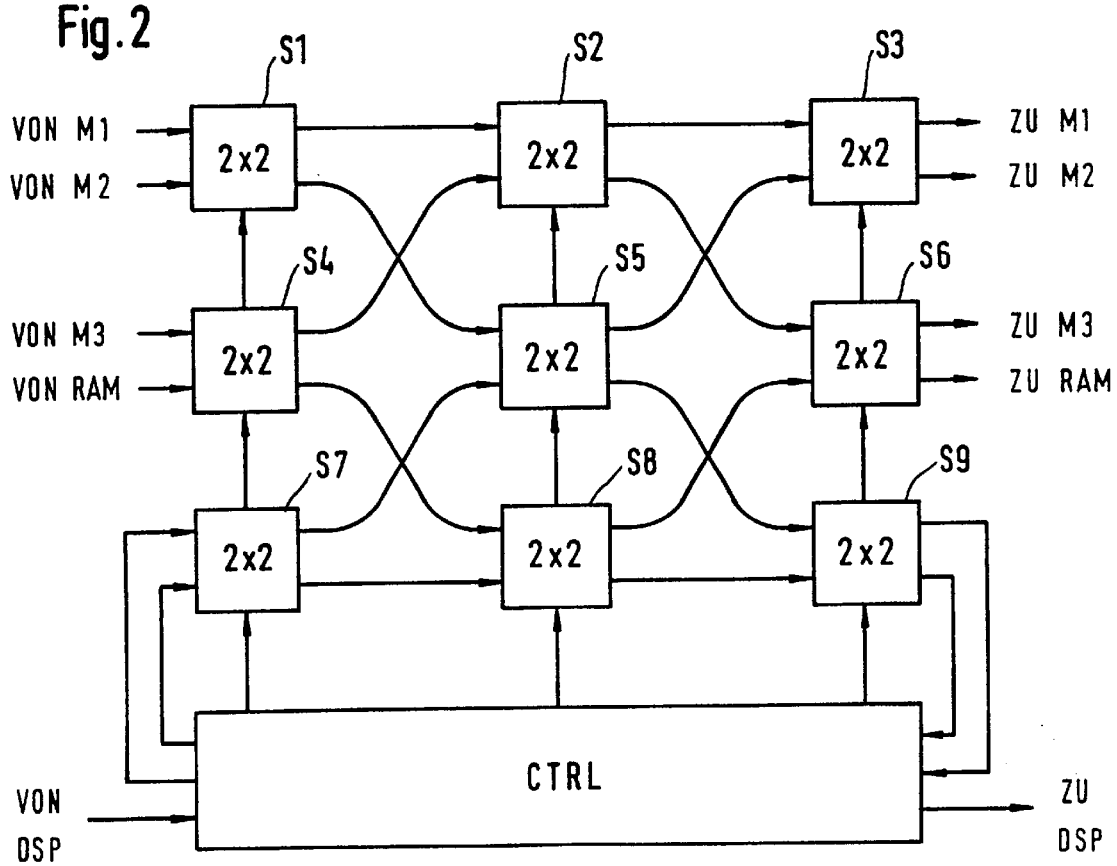
FIG. 2 shows a schematic representation of the router in accordance with the invention.

The exemplary embodiment will now be further explained with the aid of FIG. 2. The two shows a schematic representation of a router ROUTER according to the invention.

Router ROUTER contains a control unit CTRL which has an interface to processor DSP and through this interface receives data packets and instructions from processor DSP and transmits processed data packets to processor DSP. Control unit CTRL separates the received data packets from the received instructions and transmits the separated data packets according to the associated instructions to the appropriate modules M1, M2, M3.

For this purpose, router ROUTER contains several switches S1, S2, S3, S4, S5, S6, S7, S8, S9 which are controlled by control unit CTRL. Switches S1, S2, S3, S4, S5, S6, S7, S8, S9 are arranged and connected with each other such that data packets can be forwarded from each module M1, M2, M3 to each other module M1, M2, M3 by means of switches S1, S2, S3, S4, S5, S6 S7, S8, S9.

Switches S1, S2, S3, S4, S5, S6, S7, S8, S9 are all 2×2 switches, each with two inputs and two outputs. Each module M1, M2, M3 has an input and output. Memory RAM has one input and one output. The first input of switch S1 is connected with the output of module M1. The second input of switch S1 is connected to the output of module M2. The first output of switch S1 is connected to the first input of switch S2. The second output of switch S1 is connected to the first input of switch S5. Switch S1 is triggered by control unit CTRL such that the output signal of module M1 is present at first output of switch S1 and output signal of module M2 is present at the second output of switch S1 or that the output signal of module M1 is present at the second output of switch S1 and the output signal of module M2 is present at the first output of switch S1. Switches S2 through S9 are triggered in similar manner by control unit CTRL. The first input of switch S4 is connected to the output of module M3. The second input of switch S4 is connected to the output of memory RAM. The first output of switch S4 is connected to the second input of switch S2. The second output of switch S4 is connected to the first input of switch S8. The first and the second inputs of switch S7 are connected to control unit CTRL in order to transmit separated data packets to switch S7. The first output of switch S7 is connected to the second input of switch S5. The second output of switch S4 is connected to the second input of switch S8. The first input of switch S3 is connected to the first output of switch S2. The second input of switch S3 is connected to the first output of switch S5. The first output of switch S3 is connected to the input of module M1. The second output of switch S3 is connected to the input of module M2. The first input of switch S6 is connected to the second output of switch S2. The second input of switch S6 is connected to the first output of switch S8. The first output of switch S6 is connected to the input of switch M3. The second output of switch S6 is connected to the input of memory RAM. The first input of switch S9 is connected to the second output of switch S5. The second input of switch S9 is connected to the second output of switch S8. The first and second outputs of switch S9 are connected to control unit CTRL, in order to transmit processed data packets to control unit CTRL.

Control unit CTRL separates the received data packets from the received instructions, for example, by synchronizing to the synchronization signals in the header and by splitting the header off from the following data packet by means of a time multiplexer. The header is evaluated, for example by means of an allocation table, which can be filed in the memory and in which the steps are specified which are necessary for corresponding instructions. The following data packets are, for example, alternately directed to inputs one into of switch S7. By way of example, control unit CTRL receives the instruction 011110 from processor. The information is then stored in the allocation table that for 01, switches S7, S5, S3 must be triggered such that the data packet available at the first or second input of switch S7 comes to module 1 via switches S5 and S3 to module M1. The data packet processed in module M1 will appear at the first input of switch S1 so that the following triggering is implicit in the allocation table that for 11, switches S1, S2, S8 must be triggered such that the data packet available at the first input of switch S1 will come to module M3 via switches S2 and S6. The data packet processed in module M3 will appear at the first input of switch S4 so that the further triggering is implicit in the allocation table that for 10, switches S4, S2, S3 must be triggered such that the data packet present at the first input of switch S4 comes to module M2 via switches S2 and S3. The data packet processed in module M2 will appear at the second input of switch S1 so that the further triggering is implicit in the allocation table that for transmission to control unit CTRL, switches S1, S5, S9 must be triggered such that the data packet present at the second input of switch S1 comes to control unit CTRL via switches S5 and S9. If time overlaps should develop, for example, if two data packets are to be processed by one and the same module at the same time, one data packet will be written in memory RAM via switches S7, S8, S6 and will be written out from memory RAM again via switches S4, S2, S3 or S4, S2, S6 and transmitted to the proper module when it is free again. Alternative paths can also be switched. For example, one packet is to be transmitted from memory RAM to module M3 and another data packet from module M1 to module M2 at the same time. The first transfer will take place via switches S4, S2, S6 and the latter via switches S1, S5, S3. The connection via switches S1, S5, S3 in this case represents an alternative path for connecting via switches S1, S2, S3. This alternative path will be automatically selected by control unit CTRL in order first to avoid conflicts and second to process instructions as rapidly as possible. By way of example, control unit CTRL is realized as a microprocessor in a minimal version.

Control unit CTRL transmits the processed data packets to processor DSP. By way of example, the format for the transfer of information to the processor DSP is also composed of header+(processed) data packet. Control unit CTRL advantageously then transfers the processed data packets together with supplemental information containing a designation of the processed data packet via the interface to processor DSP. Processor DSP receives the processed data packet in the same for as it transferred it to the control unit CTRL. By way of example, both at the time of transfer from processor DSP to control unit CTRL as well as at the time of transfer from control unit CTRL, three bits are provided in the header after the synchronization bids for identification of three data packets. The identification bits, by way of example, are simply sequentially numbered. Data packet 1 is given the identification 001, data packet to the identification 0100, etc. Data packet 9 is given identification 01, since in the meantime data packet 1 was processed out and the identification thereby became free again. Data packet 10 receives identification 0100, etc. The processed data packets can also be temporarily stored in memory RAM and written out again and transferred to processor DSP only upon request by processor DSP. This saves processor DSP from storing them temporarily.

What is claimed is:

1. A single integrated circuit comprising:
    a processor for processing data,
    at least two modules each for processing data packets selected by the processor according to a respective different operation process, and
    a router connected between all of said modules and the processor for the purpose of controlling flow of data between the processor and the modules.

2. An integrated circuit according to claim 1 characterized in that the router receives from the processor said data packets and a plurality of associated instructions executable by said at least two modules in specified sequences to carry out special operations for said data packets, autonomously coordinates control of the sequences, transfers the data packets to an appropriate one of the modules, and transfers the data packets, after processing according to the associated instructions, to the processor.

3. A single integrated circuit comprising:

a processor for processing data, at least two modules each for processing data packets selected by the processor according to a respective different operation process, and a router connected between all of said modules and the processor for the purpose of controlling flow of data between the processor and the modules;

wherein the integrated circuit contains a memory for temporary storage of data packets to be processed, the router is connected to the memory, and the router is suited to temporarily store data packets to be processed for which a special operation is to be performed in a module which is already processing data packets.

4. A single integrated circuit comprising:

a processor for processing data, at least two modules each for processing data packets selected by the processor according to a respective different operation process, and a router connected between all of said modules and to the processor for the purpose of controlling flow of data between the processor and the modules;

wherein the router contains a control unit which has an interface to the processor which receives via this interface data packets and said associated instructions from the processor and transfers processed data packets to the processor, said control unit separating said data packets from said associated instructions and transferring the separated data packets according to the associated instructions to an appropriate one of said modules.

5. An integrated circuit according to claim 4, wherein:

the router contains several switches all of which are triggered by the control unit, the switches are arranged and connected to each other such that data packets are switched to be forwarded from each module to each other module via switches, and the control unit separates the received data packets from the received instructions and transfers the separated data packets to the appropriate modules via the switches according to the associated instructions.

6. An integrated circuit according to claim 4, characterized in that the control unit transfers the processed data packets together with supplemental information containing an identification of the processed data packets via the interface to the processor.

7. An integrated circuit according to claims 3, 4, 5 or 6 characterized in that a first module is suited to perform a filtering process, a second module is suited to perform a transformation, and a third module is suited to perform a modulation.

* * * * *